United States Patent [19]

Saha

[11] Patent Number: 4,696,535
[45] Date of Patent: Sep. 29, 1987

[54] APPARATUS FOR INJECTING LIGHT THROUGH A BUFFER-COATED OPTICAL FIBRE INTO THE CORE THEREOF AND ITS USE IN OPTICAL FIBRE SPLICING

[75] Inventor: Sanjiv Saha, London, England
[73] Assignee: BICC Public Limited Company, London, England
[21] Appl. No.: 760,681
[22] Filed: Jul. 30, 1985
[30] Foreign Application Priority Data Jul. 30, 1984 [GB] United Kingdom ............... 8419408

[51] Int. Cl.⁴ ........................... G02B 6/26; G02B 6/38
[52] U.S. Cl. ............................. 350/96.15; 350/96.21
[58] Field of Search ................ 350/96.15, 96.21; 250/227; 356/73.1

[56] References Cited

FOREIGN PATENT DOCUMENTS 0208236 3/1984 Fed. Rep. of Germany ... 350/96.15
3429947 2/1986 Fed. Rep. of Germany ... 350/96.15

Primary Examiner—Eugene R. LaRoche
Assistant Examiner—James C. Lee
Attorney, Agent, or Firm—Anthony J. Casella; Gerald E. Hespos

[57] ABSTRACT

Apparatus for injecting light into the core of a buffer coated optical fibre, especially a buffer coated single mode optical fibre, suitable for use when monitoring fusion splicing of optical fibres comprises a body of perspex having at least three faces, an arcuate contact face adapted to bear against a smoothly curved length of buffer coated optical fibre, an entry face through which light emitted by a light source is injected into the body in a direction towards the contact face, and a reflecting face which reflects injected light in a direction towards the contact face. Light injected through the entry face is directed and reflected towards the smoothly curved contact face from where it will pass through the buffer coating and cladding of an optical fibre against which the body bears into the core of the optical fibre. The body is inexpensive and operates efficiently with an inexpensive light emitting source.

12 Claims, 2 Drawing Figures

APPARATUS FOR INJECTING LIGHT THROUGH A BUFFER-COATED OPTICAL FIBRE INTO THE CORE THEREOF AND ITS USE IN OPTICAL FIBRE SPLICING

This application is related to co-pending U.S. patent application Ser. No. 760,675.

This invention relates to effecting a permanent end-to-end splice between two optical fibres, one or each of which may be a component of an optical cable. The abutting ends of two optical fibres to be spliced usually are permanently secured together by fusion or by an index-matching adhesive.

In effecting both of these methods of splicing optical fibres, before the two optical fibres are permanently secured together it is necessary to ensure that the cores of the optical fibres are axially aligned for optimum transfer of light from one fibre to the other. Axial alignment of the two optical fibres is especially critical in the case of single mode optical fibres where the diameter of the core is substantially less than the overall diameter of the optical fibre.

Two methods of obtaining optimum axial alignment of two optical fibres are currently favoured. In the first of these, light is injected into one of the optical fibres either at the end remote from the proposed splice or into a part of the optical fibre which is adjacent to the proposed splice and from which the buffer coating on the fibre, i.e. a coating of relatively soft polymeric material which overlies and protects the glass surface of the optical fibre from mechanical damage, reduces microbending loss and enables the fibre to be bent into and maintained in a bend of substantially smaller radius than would otherwise have been possible, has been removed and the amount of light passing into the cladding of the other optical fibre at the abutting ends of the optical fibres is continuously monitored. One or each of the optical fibres is moved transversely with respect to the other until said monitored light is a minimum, thereby indicating the fibres are appropriately axially aligned, and the splice is then effected. In the second of these methods, light is injected into one of the optical fibres either at the end remote from the proposed splice or into a part of the optical fibre which is adjacent the proposed splice and from which the buffer coating has been removed and the light transferred into the other optical fibre is continuously monitored at the end of the other optical fibre remote from the proposed splice or at a position in the other optical fibre adjacent the proposed splice. One or each of the optical fibres is moved transversely with respect to the other until the light is extracted from the other optical fibre either at its remote end or at said position adjacent the proposed splice is a maximum, thereby indicting the fibres are appropriately axially aligned, and the splice is then effected.

Ideally, to keep the number of operators necessary to operate the method to a minimum, light is injected into the first optical fibre at a position adjacent the proposed splice and, in the first case, light scatter from the abutting ends of the optical fibres is continuously monitored or, in the second case, light emerging from the other optical fibre at a position adjacent the proposed splice is continuously monitored.

Whilst there is no difficulty in injecting light into an optical fibre adjacent the proposed splice if the buffer coating on the optical fibre at that position is removed, we have found that it is difficult to get sufficient light into the core of the optical fibre at a position adjacent the proposed splice if the buffer coating is not removed; this difficulty is amplified where the optical fibre is a single mode optical fibre with a core of a relatively small diameter.

It is an object of the present invention to provide an improved apparatus for and method of injecting light through a buffer coated optical fibre into the core thereof.

According to the invention, the improved apparatus comprises a body which is made of a substantially rigid transparent material and which has at least three faces inclined relative to one another, said faces including a first or contact face which is of substantially arcuate shape and which is adapted to bear against a smoothly curved length of buffer coated optical fibre, a second or entry face through which light emitted by a light source can be injected into the body in a direction towards said contact face and a third or reflecting face which is of substantially planar form and which will reflect injected light in a direction towards said contact face, the inclinations of said faces relative to one another being such that at least a major proportion of light injected through the entry face into the body will be directed or reflected towards a part of the length of said smoothly curved contact face from where it will pass through the buffer coating and cladding of an optical fibre against which said body bears into the core of the optical fibre.

For a buffer-coated fibre having an overall diameter of 250 $\mu$m, preferably the smoothly curved contact face of the substantially rigid body has a radius of curvature in the range of 3.0 to 10.0 mm; a preferred radius of curvature is 4.5 mm. In this case preferably, also, the smoothly curved contact face is of such an arcuate length that it subtends an angle at its centre of curvature lying within the range 60° to 85°; where the radius of curvature of the smoothly curved contact face is 4.5 mm, preferably the smoothly curved contact face subtends an angle at its centre of curvature in the range 80° to 85°.

The entry face preferably is of substantially planar form and preferably the entry and reflecting faces are contiguous the one with the other, the angle between these two faces preferably lying within the range 80° to 90°.

The substantially rigid body is preferably made of perspex or other substantially rigid transparent plastics material and, as a consequence, is inexpensive.

A major advantage of the apparatus of the present invention lies in the fact that, because it is so efficient in focusing at least a major proportion of the light entering the substantially rigid body towards its smoothly curved contact surfaced, it operates efficiently where the light source is an inexpensive light emitting device.

The invention further includes a method of effecting local injection of light into a buffer coated optical fibre using the improved apparatus hereinbefore described, which method comprises effecting a smooth curve in a part of the length of the optical fibre and placing the smoothly curved contact surface of the substantially rigid body of the improved apparatus into facial contact with the smoothly curved length of optical fibre so that the optical fibre and the smoothly curved contact face are in interfacial contact throughout the length of the smoothly curved contact face, and injecting light from a light source through the entry face of the substantially rigid body into the body where part of the light is reflected by said reflecting face towards said smoothly curved contact face from where at least a major proportion of the light entering the substantially rigid body passes through the buffer coating and cladding of the optical fibre into the optical fibre core.

Preferably, the buffer coated optical fibre leaving the smoothly curved contact face of the substantially rigid body extends towards the proposed splice in a substantially rectilinear direction.

The apparatus and method of the present invention are especially suitable for use when light is to be injected into the core of a single mode optical fibre which is to be spliced to another single mode optical fibre.

The invention is further illustrated by a description, by way of example, of preferred apparatus for locally injecting light into the core of a buffer coated optical fibre, and of a preferred method of effecting a permanent end-to-end splice between two buffer coated optical fibres, with reference to the accompanying drawings, in which.

Figure 1:
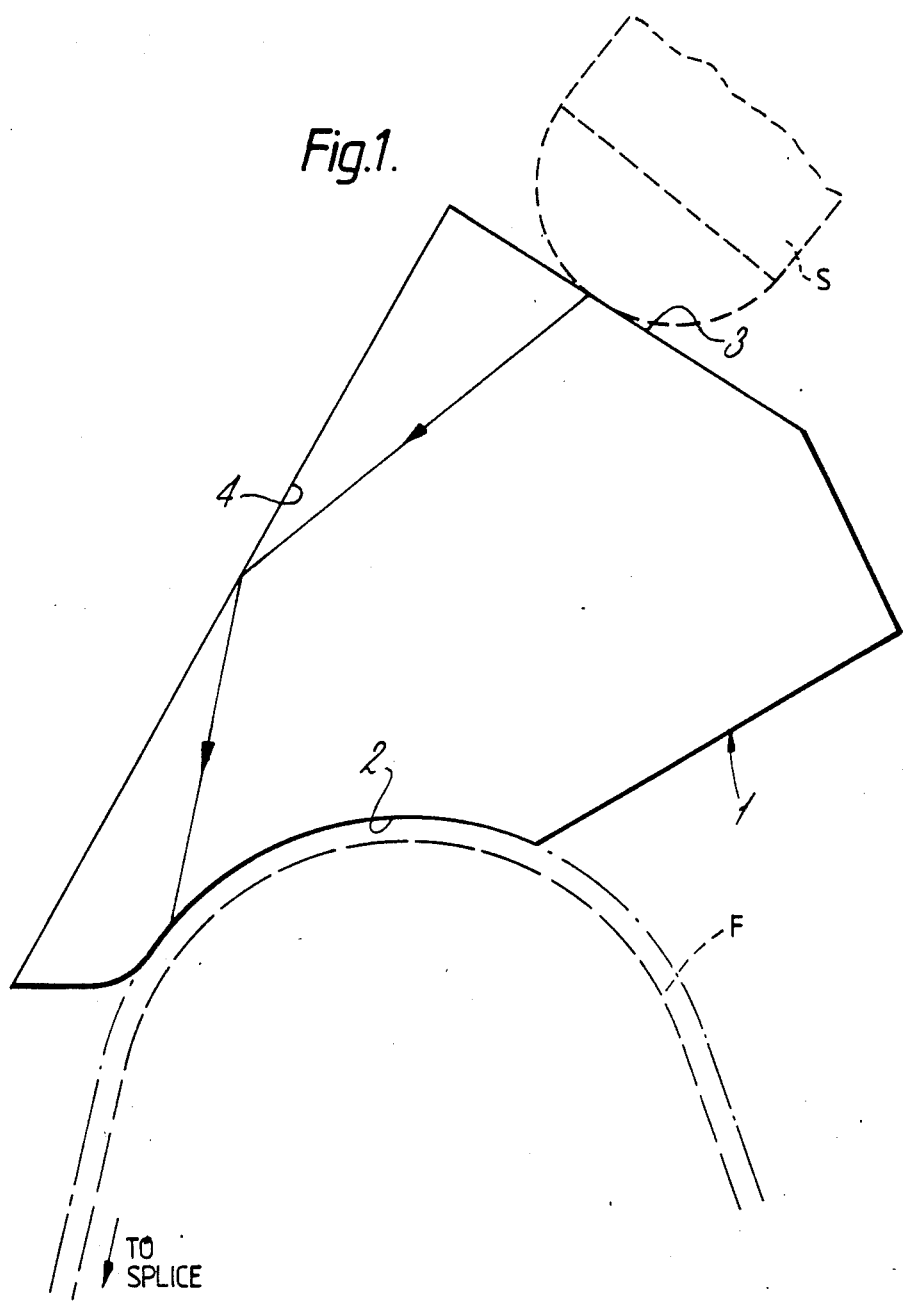
FIG. 1 is a sectional side view of the preferred apparatus.
Figure 2:
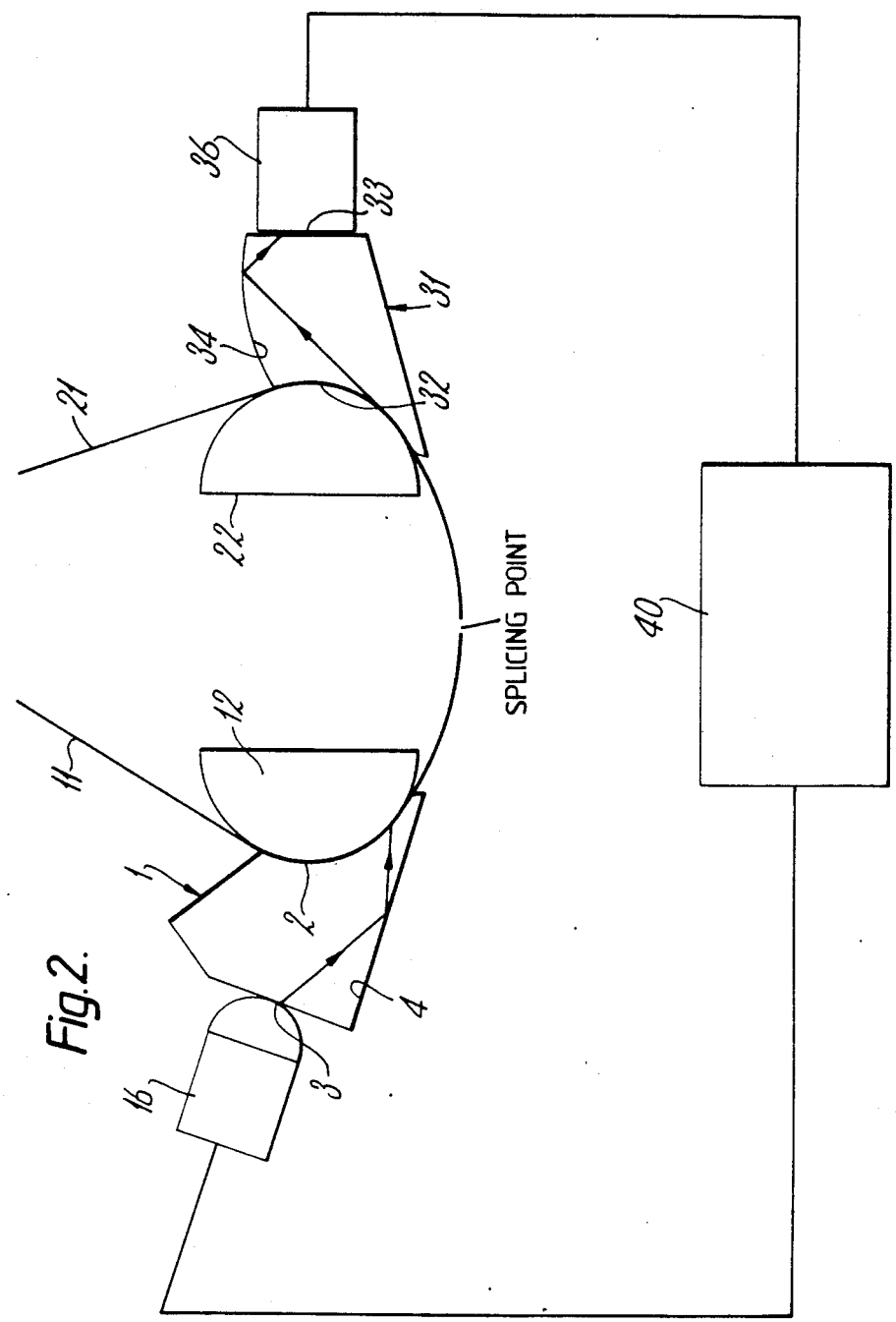
FIG. 2 is a schematic representation of the apparatus employed in the preferred method of effecting a permanent end-to-end splice between two buffer coated optical fibres.

Referring to FIG. 1, the preferred apparatus for locally injecting light into the core of a buffer coated optical fibre F comprises a substantially rigid transparent body 1 of perspex. The perspex body 1 has a contact face 2 which is of arcuate shape and which is adapted to bear against a smoothly curved length of the buffer coated optical fibre F, an entry face 3 which is of planar form and through which light emitted through a light source S can be injected into the body in a direction towards the contact face, and a reflecting face 4 which is of planar form, which is contiguous with the entry face 3 and which will reflect injected light in a direction towards the contact face. The contact face 2 has a radius of curvature of 4.5 mm and subtends an angle at its centre of curvature of 85°; the angle between the entry face 3 and reflecting face 4 is 85°. At least a major proportion of light injected through the entry face 3 into the body 1 will be directed or reflected towards a part of the length of the smoothly curved contact face 2 from where it will pass through the buffer coating and cladding of an optical fibre against which the body bears into the core of the optical fibre.

In the preferred method of effecting an end-to-end splice between two buffer coated optical fibres, the buffer coating is locally removed from each optical fibre 11, 21 over a short length of the fibre immediately adjacent the end to be spliced and a length of buffer coated optical fibre 11 is laid around the smoothly curved convex surface of an anvil 12 and a length of buffer coated optical fibre 21 is laid around the smoothly curved convex surface of an anvil 22, the convex surfaces of the anvils each having a radius of curvature of 4.5 mm.

A rigid body 1 of perspex as illustrated in FIG. 1 is positined dimmediately adjacent the smoothly curved length of buffer coated optical fibre 11 so that the contact face 2 of the body bears against the smoothly curved length of buffer coated optical fibre and a rigid body 31 of perspex is positioned immediately adjacent the smoothly curved length of buffer coated optical fibre 21 so that an arcuate contact face 32 on the body 31 bears against the smoothly curved length of buffer coated optical fibre 21. The rigid body 31 is suitable for extracting light from the core of the optical fibre 21 through the cladding and buffer coating thereof and is the subject of my co-pending U.S. patent application Ser. No. 760,675 filed on the same day as the present application. In addition to the arcuate contact face 32, the body 31 has an exit face 33 through which light emerging from the optical fibre can pass and a smoothly curved reflecting face 34 which will reflect light entering the body through the contact face in a direction towards the exit face. The shapes of the contact, reflecting and exit faces 33, 34 and 33 and the positions of the reflecting and exit faces relative to the contact face are such that at least a major proportion of light passing from the core of the optical fibre 21 through the cladding and buffer coating of the optical fibre and through the smoothly curved contact face 32 into the body 31 will be directed or reflected towards the exit face 33. A light source 16 is positioned adjacent the body 1 and a photodiode or other light detector 36 is positioned adjacent the body 31.

With the ends of the optical fibres 11, 21 from which the buffer coatings have been removed so arranged that they substantially abut with their cores in approximately axial alignment, light from the light source 16 is injected through the entry face 3 of the body 1 into the body and is directed and reflected in the body towards the contact face 2 from where it passes through the buffer coating and cladding of the smoothly curved length of buffer coated optical fibre 11 into the core of the optical fibre. A proportion of light from the core of the optical fibre 11 passes into the core of the optical fibre 21. Light from the core of the smoothly curved length of buffer coated optical fibre 21 passes through the cladding and buffer coating of the optical fibre and through the contact face 32 of the body 31 into the body and is directed or reflected in the body towards the exit face 33 from where it passes into the photodiode or other light detector 36. One or each of the optical fibres 11, 21 is moved transversely with respect to the other until the light locally extracted from the optical fibre 21 is a maximum, thereby indicating that the cores of the fibres are appropriately axially designed, and the splice is then effected.

Axial alignment of the cores of the optical fibres for optimum transfer of light from one fibre to the other using the apparatus and method hereinbefore described and fusion splicing of the aligned optical fibres can be effected automatically by means of equipment 40 associated with the light injection and detection apparatus.

What I calim as my invention is:

1. Apparatus for injecting light through a buffer coated optical fibre into the core thereof, which apparatus comprises a body which is made of a substantially rigid transparent material and which has at least three faces inclined relative to one another, said faces including a contact face which is of substantially arcuate shape and which is adapted to bear against a smoothly curved length of buffer coated optical fibre, an entry face through which light emitted by a light source can be injected into the body in a direction towards said contact face and a reflecting face which is of substantially planar form and which will reflect injected light in a direction towards said contact face, the inclinations of said faces relative to one another being such that at least a major proportion of light injected through the entry face into the body will be directed or reflected towards a part of the length of said smoothly curved contact face from where it will pass through the buffer coating and cladding of an optical fibre against which said body bears into the core of the optical fibre.

2. Apparatus as claimed in claim 1, wherein the smoothly curved contact face of the substantially rigid body has a radius of curvature in the range 3.0 to 10.0 mm.

3. Apparatus as claimed in claim 1, wherein the smoothly curved contact face is of such an arcuate length that it subtends an angle at its centre of curvature lying within the range 60° to 85°.

4. Apparatus as claimed in claim 2, wherein the smoothly curved contact face of the substantially rigid body has a radius of curvature of 4.5 mm.

5. Apparatus as claimed in claim 4, wherein the smoothly curved contact face subtends an angle at its centre of curvature in the range 80° to 85°.

6. Apparatus as claimed in claim 1, wherein the entry face is of substantially planar form and the entry and reflecting faces are contiguous the one with the other.

7. Apparatus as claimed in claim 6, wherein the angle between the entry and reflecting faces lies within the range 80° to 90°.

8. Apparatus as claimed in claim 1, wherein the substantially rigid body is made of substantially rigid transparent plastics material.

9. Apparatus as claimed in claim 2, wherein the smoothly curved contact base is of such an arcuate length that it subtends an angle at its centre of curvature lying within the range 60° to 85°.

10. A method of effecting local injection of light into a buffer coated optical fibre, which method comprises effecting a smooth curve in a part of the length of an optical fibre; placing into facial contact with the smoothly curved length of optical fibre a smoothly curved contact face of a body made of a substantially rigid transparent material so that the optical fibre and the smoothly curved contact face are in interfacial contact throughout the length of the smoothly curved contact face, which contact face is one of at least three faces of said body inclined relative to one another and including said contact face, an entry face through which light emitted by a light source can be injected into the body in a direction towards said contact face and a reflecting face which is of substantially planar form and which will reflect injected light in a direction towards said contact face; and injecting light from a light source through the entry face of the substantially rigid body into the body where part of the light is reflected by said reflecting face towards said smoothly curved contact face from where at least a major portion of the light entering the substantially rigid body passes through the buffer coating and cladding of the optical fibre into the optical fibre core.

11. A method of effecting a permanent end-to-end splice between two buffer coated optical fibres which comprises arranging the two optical fibres in approximately axial alignment with their neighbouring end faces substantially abutting; effecting a smooth curve in a part of the length of one of the buffer coated optical fibres adjacent to the proposed splice; placing into facial contact with the smoothly curved length of optical fibre a smoothly curved contact face of a body made of a substantially rigid transparent material so that the optical fibre and the smoothly curved contact face are in interfacial contact throughout the length of the smoothly curved contact face, which contact face is one of at least three faces of said body inclined relative to one another and including said contact face, an entry face through which light emitted by a light source can be injected into the body in a direction towards said contact face and a reflecting face which is of substantially planar form and which will reflect injected light in a direction towards said contact face; injecting light from a light source through the entry face of the substantially rigid body ingto the body where part of the light is reflected by said reflecting face towards said smoothly curved contact face from where at least a major proportion of the light entering the substantially rigid body passes through the buffer coating and cladding of the optical fibre into the optical fibre core; continuously monitoring light emerging from a smoothly curved length of the other buffer coated optical fibre at a position adjacent the proposed splice; moving at least one of the optical fibres transversely with respect to the other until the light emerging from said other optical fibre is a maximum; and permanently securing the abutting ends of the optical fibres together.

12. A method of effecting a permanent end-to-end splice between two buffer coated optical fibres which comprises arranging the two optical fibres in approximately axial alignment and with their neighbouring end faces substantially abutting; effecting a smooth curve in a part of the length of one of the buffer coated optical fibres adjacent to the proposed splice; placing into facial contact with the smoothly curved length of optical fibre a smoothly curved contact face of a body made of a substantially rigid transparent material so that the optical fibre and the smoothly curved contact face are in interfacial contact throughout the length of the smoothly curved contact face, which contact face is one of at least three faces of said body inclined relative to one another and including said contact face, an entry face through which light emitted by a light source can be injected into the body in a direction towards said contact face and a reflecting face which is of substantially planar form and which will reflect injected light in a direction towards said contact face; injecting light from a light source through the entry face of the substantially rigid body into the body where part of the light is reflected by said reflecting face towards said smoothly curved contact face from where at least a major proportion of the light entering the substantially rigid body passes through the buffer coating and cladding of the optical fibre into the optical fibre core; continuously monitoring light passing into the cladding of the other optical fibre at the substantially abutting ends of the optical fibres; moving at least one of the optical fibres transversely with respect to the other until said monitored light is a minimum; and permanently securing the abutting ends of the optical fibres together.

* * * * *